US008353314B2

(12) United States Patent

Radford et al.

(10) Patent No.: US 8,353,314 B2

(45) Date of Patent: Jan. 15, 2013

(54) GAS CONTAINER ASSEMBLIES AND COUPLINGS THEREFOR

(75) Inventors: Richard Radford, Nottingham (GB); David Edgar Peel, Southwell (GB); Andrew Richard Thomas Tatarek-Gintowt, Hants (GB); Arthur Frederick George King, Surrey (GB)

(73) Assignee: BPR Medical Limited, Mansfield (GB)

( * ) Notice: Subject to any disclaimer, the term of this patent is extended or adjusted under 35 U.S.C. 154(b) by 906 days.

(21) Appl. No.: 12/321,264

(22) Filed: Jan. 16, 2009

(65) Prior Publication Data

US 2009/0166226 A1 Jul. 2, 2009

(30) Foreign Application Priority Data

Jul. 18, 2006 (GB) .................................. 0614239.2
Jul. 18, 2007 (GB) ................ PCT/GB2007/002731

(51) Int. Cl.
*F16L 37/22* (2006.01)

(52) U.S. Cl. ........... 137/614.05; 137/614.06; 251/149.6; 251/149.8; 251/149.9

(58) Field of Classification Search ............. 137/614.05, 137/614.06, 614; 251/149.8, 149.9, 149.1, 251/149.6

See application file for complete search history.

(56) References Cited

U.S. PATENT DOCUMENTS

| | | | | | |
|---|---|---|---|---|---|
| 3,646,965 | A | * | 3/1972 | Swartz | 137/614.06 |
| 4,235,267 | A | * | 11/1980 | Brake et al. | 141/293 |
| 4,479,520 | A | | 10/1984 | Holben | |
| 4,586,634 | A | * | 5/1986 | Minter et al. | 222/3 |
| 4,809,747 | A | * | 3/1989 | Choly et al. | 137/614.06 |
| 5,290,009 | A | | 3/1994 | Heilmann | |
| 5,445,358 | A | | 8/1995 | Anderson | |
| 6,739,578 | B2 | * | 5/2004 | Barton et al. | 251/149.9 |
| 7,153,296 | B2 | * | 12/2006 | Mitchell | 604/533 |
| 7,174,914 | B2 | * | 2/2007 | Ooishi et al. | 137/614.03 |
| 2005/0253105 | A1 | | 11/2005 | Gardner, Jr. et al. | |

FOREIGN PATENT DOCUMENTS

| | | | |
|---|---|---|---|
| EP | 1 455 131 | A1 | 9/2004 |
| FR | 2724709 | A1 | 3/1996 |
| GB | 1047122 | | 11/1966 |
| GB | 2 111 154 | A | 6/1983 |
| JP | 2000-120964 | | 4/2000 |
| WO | WO 86/01871 | | 3/1986 |

* cited by examiner

*Primary Examiner* — John Rivell
*Assistant Examiner* — R.K. Arundale
(74) *Attorney, Agent, or Firm* — Weide & Miller, Ltd.

(57) ABSTRACT

A modular coupling system allows a combined gas canister and integral regulator to be used with a wide range of different utilizer devices such as flow meter, conservor or delivery apparatus. A first coupling part is secured to the pressurized gas canister permanently, and carries a combined main delivery valve and venting valve to allow connection of the gas utilizer to the canister by means of a second coupling part formed integrally with or attached to the gas utilizer device by a simple push and twist action which, upon fitting, closes the venting valve; and opens the main delivery valve in sequence.

11 Claims, 9 Drawing Sheets

GAS CONTAINER ASSEMBLIES AND COUPLINGS THEREFOR

CROSS-REFERENCE TO RELATED APPLICATIONS

This application is a continuation of and claims priority to PCT Application No. PCT/GB/2007/002731 titled Improvements in or Relating to Gas Container Assemblies and Couplings Therefor, filed Jul. 18, 2007, which claims priority to Great Britain Application No. 0614239.2, filed Jul. 18, 2006.

BACKGROUND OF THE INVENTION

1. Field of the Invention

The present invention relates generally to gas container assemblies, and particularly to an improved coupling for interconnecting a gas container having an integral regulator with other equipment such as a flow meter, flow indicator or delivery apparatus.

2. Related Art

The present invention finds particular utility in the medical field, where it is frequently required to deliver a gas, such as oxygen, or a mixture of gases to a patient for inhalation. In such circumstances a large volume of gas is required, for which reason the container (usually in the form of a cylinder) is filled with gas under considerable pressure (for example between 137 and 300 bar) and the outlet is provided with a pressure regulator which delivers the gas to the delivery apparatus at a pressure suitable for such apparatus, typically in the region of 4 bar.

Basic gas cylinders for this purpose are simple containers or vessels with an on/off valve and a connection port by which the pressure regulator can be fitted thereto. The pressure regulator itself has an outlet connection to allow the delivery apparatus to be connected thereto.

One problem which has occurred frequently in the use of pressurized gas containers of this type, especially those delivery oxygen, is the risk of fires which are generally initiated by the introduction of hydrocarbons and/or debris at the high pressure interface between the cylinder and the external regulator. For this purpose gas canisters or cylinders with permanently fitted or integral regulators and flow meters have been developed over recent years. In this context, the term "integral" as applied to pressure regulators will be understood to include those which are attached in such a way that they are difficult to remove or impossible to remove without specialist equipment. The flow meter is required for many uses as it provides an accurate, metered flow of the gas based upon the stable pressure derived from the regulator downstream from which the flow meter is fitted. It will be appreciated that in the medical environment patients are prescribed a specific flow rate of gas not a specific pressure of gas, and the flow meter provides this controlled flow rate.

Although this meets the fire risk it has attendant disadvantages, not least of which are the economic penalties of complex equipment. A gas canister fitted with an integral regulator and flow meter is obviously more expensive to produce and involves a greater ongoing "carrying" cost than merely a plain gas canister or cylinder since the additional cost of providing the regulator and flow meter must be borne over the length of the life of the container. In this connection it will be appreciated that such gas canisters or cylinders are very robust and intended for repeated filling, for which purpose an infrastructure of refill stations and delivery and return operations have been developed. At the refill stations a large quantity of empty canisters are stored, filled, or ready for refill, and subsequent delivery to fresh destinations. Because there is a wide range of flow rates required for different gases and different medical conditions, as well as a range of differences between gas cylinders, such as those designed for infant use and those designed for adult use (infants typically require flow rates in the region of one tenth of the flow rates required by adults) as well as different capacities, this involves maintaining a wide range of cylinders of different sizes fitted with flow meters having different ranges of flow rates, and this naturally results in an increase in the costs of the operation.

It would be a valuable advantage, therefore, to be able to interchange at least the flow meter component of a gas cylinder in order to be able to make use of a standardized cylinder and regulator combination whilst nevertheless maintaining the opportunity to provide a wide range of flow rates without compromising the fire safety inherent in the use of an integral regulator.

SUMMARY OF THE INVENTION

According to one aspect of the present invention, therefore, a modular coupling system for pressurized gas containers, comprises a first coupler part adapted to be fixedly secured to a pressurized gas cylinder in a substantially non-removable manner and a second coupler part adapted to be fixedly secured to, or integrally formed with, a gas utilizer device or equipment such as a flow meter, conservor or other delivery apparatus, the said first coupler part being provided with valve closure means and the coupling system having venting means allowing escape of trapped pressurized gas upon removal of a gas utilizer device or equipment from a pressurized gas container before separation of the said two coupler parts takes place.

A conservor is a device which acts somewhat like a demand valve to deliver gas at a metered flow rate only during inhalation intervals thereby conserving the gas which would be wasted by a flow meter during exhalation.

It is considered important in the gas canister industry that the coupling between the cylinder and the regulator is maintained permanently connected in order to avoid contamination by being exposed to the atmosphere, and to avoid the leakage risk since the coupling between the regulator and the gas cylinder is a high pressure coupling. Because the coupling of the present invention vents to atmosphere before being released, it ensures that any dust or detritus in the area is blown clear before the final separation of the removable coupling part from the container assembly. It is also possible that the dimensions of the coupling parts may be so chosen that during the connection operation for connection of a utilizer device to the container assembly, the connecting motion acts to open a main closure valve of the assembly just before the seal is made so that a small escape of gas from the container (albeit at the regulated pressure in the region of 4 bar) flowing through the coupling can act to dislodge and remove any items of dust or detritus which might otherwise interfere with the operation of the unit.

In order to obtain permanent fixing of the first coupler part to a pressurized gas container, this latter may be fixable to a pressurized gas container by screw fixing means, welding or any other suitable technique.

Preferably the said first coupler part has a gas delivery valve resiliently biased to a closure position, the gas delivery valve having a valve-operating member in use by the second coupler part upon coupling together of the said two coupler parts. Conveniently, the said valve-operating member is a valve stem, the displacement of which causes opening or closing of the valve.

In one embodiment of the invention the coupler parts have a common axis and the said valve-operating member is displaceable axially thereof to effect opening or closure of the gas delivery valve, and the said second coupler part has a helical cam face causing relative axial movement of the said first and second coupler parts as they are turned with respect of one another about the said common axis.

In a preferred embodiment of the invention the coupler parts have a common axis and the valve-operating member is displaceable transversely thereof to effect opening or closure of the gas delivery valve as the two coupler parts are turned with respect to one another about the said common axis.

In either of the two above-mentioned embodiments the gas delivery valve is oriented in such a way that the closing displacement of the said valve-biasing means is reinforced by the pressure of the gas within the container.

The venting means is preferably linked to the gas delivery valve in such a way as to be opened by the same valve movement as closes the gas delivery valve itself. In this way a single action to separate the first and second coupler parts will both vent the coupling and close the valve, the venting taking place prior to mechanical separation of the two closure parts.

For this purpose the venting means may comprise a valve sealing member carried on a stem of the gas delivery valve such that opening of the gas venting means and closure of the gas delivery valve take place substantially simultaneously upon displacement of the single valve-operating member constituted by the safety valve stem. In a preferred embodiment this takes place in sequence; that is the valve closes, then ventilation takes place, and finally separation of the coupling parts occurs.

Since a single separating motion is able to remove the releasable part of the coupling (the said second coupler part) it is useful to have a further safety interlock member which retains the said first and second coupler members in their coupled positions against inadvertent separation thereof. This may take the form of a latch which may be manually displaceable from a latching position to a release position in order to allow relative displacement of the said two coupler parts to commence separation thereof for uncoupling.

According to a second aspect of the present invention, there is provided a pressurized gas container assembly of the type comprising a container with an integral flow regulator, having means for releasably coupling it to utilize equipment such as a flow meter, conservor, or delivery apparatus, the releasable coupling means comprising a first coupling part fixedly connected to or integrally formed with the gas container and a second coupling part fixedly connected to or integrally formed with the said utilizer equipment and being so formed that upon release of the second coupling part from the first coupling part a closure valve is automatically closed and the pressure within the releasable coupling means is automatically vented to substantially atmospheric pressure prior to mechanical separation of the two coupling parts of the releasable coupling means and removal of the utilizer device from the gas container assembly.

Preferably the first part of the releasable coupling means has a closure valve resiliently biased to a closed position and a valve-operating member connected by the second coupling part on connection thereof to the said first coupling part.

In a preferred embodiment of the invention the closure valve has a stem which is engaged by the second coupling part and displaced axially upon connection of the second coupling part to the first coupling part.

It is also preferred that the said second releasable coupling means has a first interlock device comprising an abutment member resiliently biased to an inoperative position in which it allows relative movement of the two parts of the coupling means in relation to one another, and displaceable against the resilient bias by gas under pressure within the second coupling part arriving from the closure valve upon opening thereof as a utilizer device is connected to the gas container.

The first interlock means ensures that the utilizer equipment cannot be inadvertently removed whilst the main closure valve of the container assembly is still open, as this could cause unwanted escape of a large amount of gas (itself creating a fire risk if the gas is combustible or a supporter of combustion, such as oxygen) and the forces involved could cause injury if coupling components were allowed to separate violently as by the rapid escape of gas. For this reason the coupling means includes cooperating components which will be described in more detail below, having flange and/or shoulder surfaces which remain in contact to hold the utilizer equipment to the container assembly until such time as the pressure within the coupling means has vented to substantially atmospheric pressure.

Thus, in this embodiment the said first interlock device comprises a pin one end of which enters a cavity or recess in the first part of the coupling means to limit the relative rotation of the first and second coupling parts about a common axis thereof when the gas pressure within the coupling means exceeds a threshold value set by the resilient bias acting on the pin.

It will be appreciated that the separating motion involves rotation of the body of the coupling unit, for which purpose it is turnable about an axis of relative rotation between a released position and an engaged position.

Such relative rotation between the two coupling parts between a released position and an engaged position may also involve an axial component of motion, and the mechanical interconnection of the two coupling parts is preferably such that relative axial displacement between these two takes place as the coupling is turned about the said axis of relative rotation between the two coupling parts. As mentioned above the seal between the two coupling parts is preferably brought into gas tight sealing operation as the utilizer equipment is turned about the said axis of relative rotation of the two coupling parts with respect to the container assembly between the said released position and the said engaged position of the coupling A second interlock means may comprise a mechanical interlock member resiliently biased to an operative position and brought into engagement upon connection of the utilizer equipment to the container assembly at the engaged position which defines the connected condition of the equipment.

The said mechanical interlock member conveniently comprises a lock pin which, in use, enters a cooperating opening in one coupling part upon connection thereof and is manually displaceable, against the action of the resilient biasing means, to allow the coupling parts to turn with respect to one another about the said axis of relative rotation until further such relative rotation is prevented by the pressure sensitive first interlock means. The lock pin thus is provided on or carried by the first part of the two-part coupling.

In the preferred embodiment the said lock pin lies with its longitudinal axis in a substantially transverse orientation with respect to the said axis and one end thereof projects through an opening in a skirt portion of one coupling part until the coupling is in the engaged position.

Axial separation of the two coupling parts is resisted while the coupling is moving between the engaged and released positions thereof (as previously defined), by the interengagement of a part-circumferential radially outwardly projecting flange or shoulder on one part with a part-circumferential radially inwardly projecting flange or shoulder on the other part. At least a part of the contacting faces of these said flanges or shoulders on respective coupling parts are preferably inclined with respect to a plane orthogonal to, the said axis of relative rotation whereby to provide the said axial component of movement upon relative turning of the coupling parts with respect to one another.

According to one aspect of the present invention, therefore, a coupling for a pressurized gas container of the type comprising a container assembly having an integral flow regulator, for releasably coupling the container assembly to associated equipment such as a flowmeter, flow indicator or delivery apparatus, is provided with interlock means operable to prevent removal thereof from the container assembly until a closure valve of the container assembly has closed and the pressure within the coupling unit has vented to substantially atmospheric pressure.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. Various embodiments of the present invention will be more particularly described, by way of example, with reference to the accompanying drawings, in which.

DETAILED DESCRIPTION OF THE PREFERRED EMBODIMENTS

Figure 1:
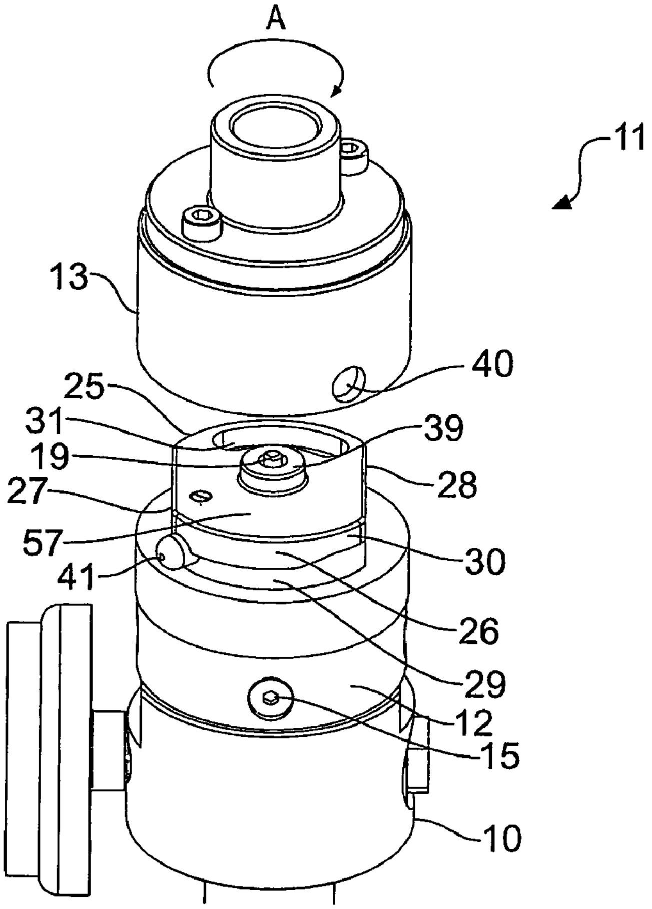
FIG. 1 is a perspective view from above illustrating a coupling forming a first embodiment of the present invention, with the two parts thereof shown separated.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Referring first to FIGS. 1 to 5 of the drawings, there is shown a coupling 11 for connection to a regulator indicated 10 attached to a gas cylinder (not shown) such as an oxygen cylinder, and comprising a base unit 12 and a coupling unit 13 shown spaced from one another in the drawings. The base unit 12 is intended to be permanently secured in position on one end of the gas cylinder 10 (not shown) and as can be seen in the drawings, the base unit 12 has a depending cylindrical skirt 14 with three openings through which pass fixing set screws 15 which secure the base unit 12 in place on the cylinder 10.

The base unit 12 has a main body 16 from which the skirt portion 14 depends, and the main body 16 is provided with a central passage 17 (see FIGS. 3 and 4) housing a poppet valve generally indicated 18 having an operating stem 19, and a piston head 20 which locates a sealing ring 21 against a shoulder 22 at the upper end of the main gas passage 17. A biasing spring 23 acting between a lower radially inwardly projecting flange 24 at the lower end of the gas passage 17 and the under surface of the piston 20 urges the poppet valve 18 to the closure position in which the seal 21 is pressed against the shoulder 22.

As can be seen in FIG. 1 the stem 19 of the poppet valve 18 projects through a central opening in the body 16 of the base unit 12. The main body 16 of the base unit 12 is in the form of a generally cylindrical turret 57 with two arcuately curved peripheral sections 25, 26 and two rectilinear sections 27, 28. The arcuately curved sections 25, 26 have undercut grooves 29 (only one of which can be seen in FIGS. 1 and 2, namely that associated with the circumferential section 26). The circumferential sections 25, 26 thus define radially projecting flanges which overhang or project beyond the cylindrical surfaces of the grooves 29. At one end of each of these flanges 25, 26, which constitute the arcuately curved circumferential sections, the planar surface is provided with an inclined or ramp portion 30 (again only one of which, namely that on the circumferential section 26, is visible in FIGS. 1 and 2) for a purpose which will be described in more detail below.

The upper flat surface of the turret 57 of the base unit 16, through which the stem 19 of the main delivery valve 18 projects, also has an arcuate slot 31 for a purpose which will be described in more detail below.

Figure 2:
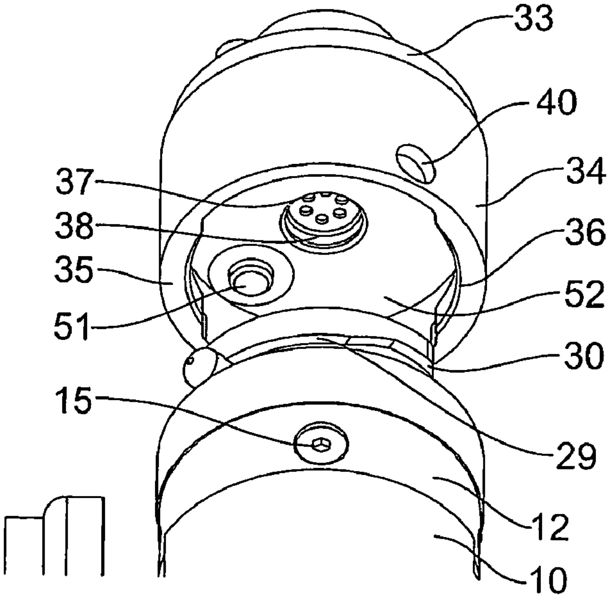
FIG. 2 is a perspective view from a different orientation illustrating the same components as in FIG. 1, separated in the same manner.
Figure 3:
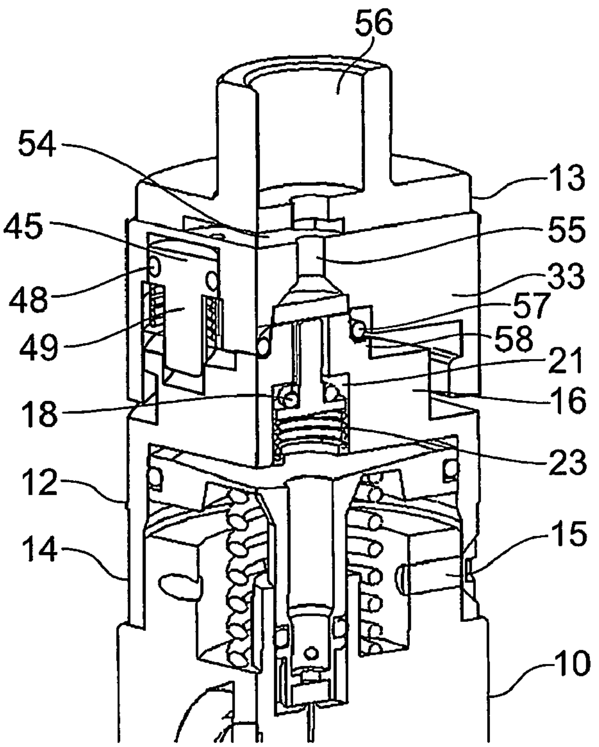
FIG. 3 is a cut-away perspective view of the coupling of FIGS. 1 and 2 showing the coupling unit held in place on a base of the coupling during release thereof.

As can be seen in FIG. 2 the coupling unit 13 comprises a main body portion 33 from which depends a skirt portion 34 the lower rim of which has two radially inwardly directed part-circumferential flanges 35, 36 (see FIG. 2) so shaped that the coupling unit 13 can only be placed in position on the base unit in one orientation, with the flanges 35, 36 in register with the flat faces 27, 28 of the turret on the base unit. Relative turning motion of the coupling unit 13 with respect to the base unit 12 then allows the radially inwardly directed flanges 35, 36 to slide in the grooves 29 so that the radially outwardly projecting flanges 25, 26 of the turret on the base unit interengage with the radially inwardly directed flanges 35, 36 on the skirt of the coupling unit, with the ramp portions 30 drawing the two parts axially together so that a sealing ring 37 in a central opening 38 in the coupling unit 13 engages a central boss 39 on the turret 57 of the base unit 12.

The skirt portion 34 of the coupling unit 13 also has a radial aperture 40 which interengages with a resiliently biased manually-operable lock pin 41 carried on the body portion of the base unit 12. This pin 41 is shown in more detail in FIG. 5. It has a bull-nose radially outer end 42, and a hollow central portion 43 housing a biasing spring 44 which urges it radially outwardly to the position illustrated in FIGS. 1 and 2, in which position it is held by interengagement of abutment means (not illustrated). By pressing on the bull-nose rounded end 42 with a thumb or finger the pin 41 can be urged radially inwardly so that it is located within the aperture 40 whereupon relative turning movement of the coupling unit 13 and the base unit 12 presses the pin 41 further inwardly so that the bull-nose part 42 slides on the inner surface of the skirt portion 34 of the coupling unit 13.

Figure 4:
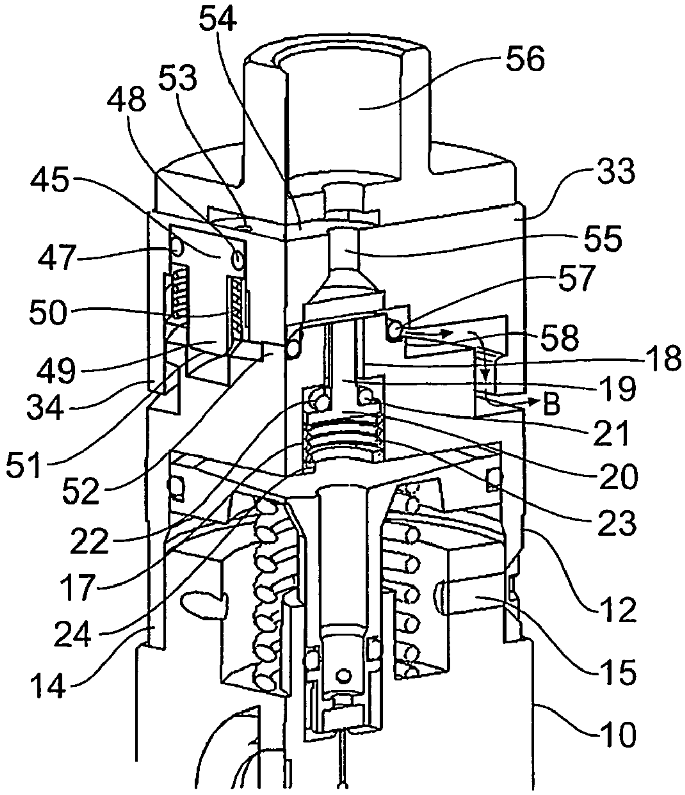
FIG. 4 is a cut-away perspective view similar to that of FIG. 3, showing the relative positions of the pressure-sensitive interlock device after the interior pressure within the coupling has fallen to atmospheric pressure.
Figure 5:
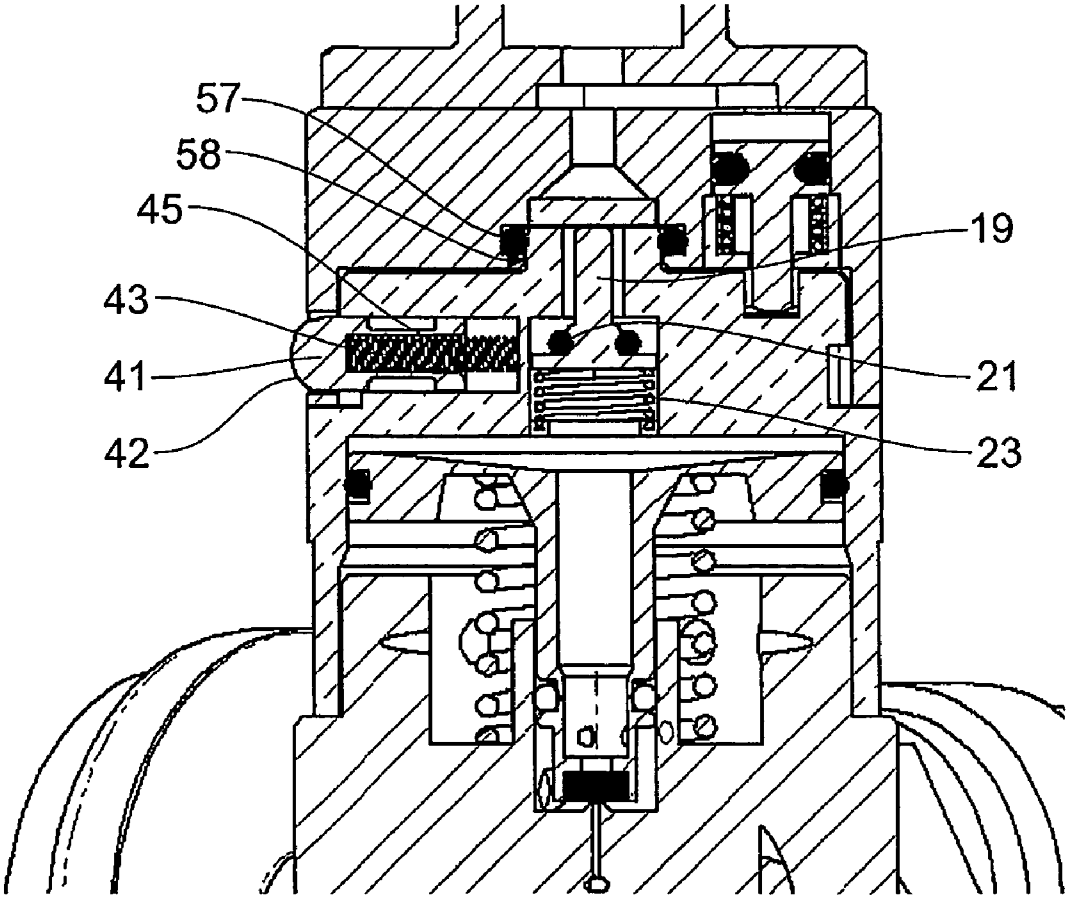
FIG. 5 is an axial sectional view on an enlarged scale through a different plane illustrating the manual interlock device.

The coupling unit 13 also carries a pressure-sensitive interlock device which can be seen best in FIG. 4. This comprises a piston 45 located within a cylindrical chamber and sealed with a sealing ring 48. The piston 45 has an axially extending pin 49 and is resilient biased by a spring 50 to the position illustrated in FIG. 4 in which the lower end 51 of the pin 49 is substantially flush with or projects only slightly from a lower surface 52 of the body 33 of the coupling unit 13 (see FIG. 2), which shows the lower end 51 of the pin 49 just projecting below the surface 52 of the body 33 of the coupling unit 13.

The upper end of the cylindrical chamber 47 communicates via a passage 53 with a gallery 54 in communication with a central opening 55 through the body 33 of the coupling unit 13 leading to an outlet connector 56.

In use the coupling can be made by depressing the pin 41 manually to a position where the bull-nose portion 42 is approximately radially in register with the curved arcuate surface of the flange 26 of the turret 57 on the base unit allowing the coupling unit 13 to be lowered over the base unit 12 with the radially inwardly directed flanges 35, 36 in register with the rectilinear portions 27, 28 which are slightly asymmetrical so that the coupling unit 13 can be fitted in position in only one of the two possible orientations. Then, by rotating the coupling unit 13 with respect to the base unit 12 in a clockwise direction as viewed from above (illustrated by the arrow A in FIG. 1) the flanges 35, 36 of the coupling unit 13 are brought under the "claw" of the radially outwardly projecting flanges 25, 26 on the turret 57, with the ramp 30 causing the two parts 13, 12 to be drawn axially together until the aperture 40 comes into register with the bull-nose 42 of the pin 41 whereupon the spring 43 urges the pin to enter the hole 40 to adopt the position illustrated in FIG. 5. In doing so the pin 19 of the poppet valve 18 is depressed by the contacting undersurface of the body 33 of the coupling unit 13 causing it to move axially towards the gas cylinder 10 compressing the spring 23 and displacing the sealing ring 21 from the shoulder 22 so that gas from the cylinder can flow through the passage 55 into the gallery 54 and from there through the opening 53 into the cylindrical chamber 47 urging the piston 45 downwards to press the pin 49 axially until the tip 51 thereof engages into the arcuate slot 31 of the base unit 12. As the final connection is made a small amount of gas from the cylinder 10 escapes through the interface between the base unit 12 and the coupling unit 13 clearing out any dust or foreign bodies which may have collected there during storage.

In order to release the coupling unit 13 from the gas container assembly comprising the cylinder 10 and the base unit 12 it is necessary first to depress the bull-nose 42 with a thumb or finger whereupon the coupling unit 13 can be rotated in an anticlockwise direction opposite that of the arrow A in FIG. 1 through a small angle limited by the interengagement of the tip 51 of the pin 49 in the arcuate groove 31 in the turret 57 of the base unit 12. This limited angular movement leaves the axial interengagement of the cooperating radially inwardly directed flanges 35, 36 on the skirt of the coupling unit 13 and the radially outwardly directed flanges 25, 26 on the turret 57 in place so that axial separation of the coupling unit 13 and the base unit 12 cannot take place. The ramp 30 allows a limited amount of axial movement during this first limited arcuate turning of the coupling unit 13 so that the pressure on the stem 19 of the poppet valve 18 is released and the spring 23 can press the sealing ring 21 against the shoulder 22 closing this valve. This closure is, of course, also reinforced by the pressure on the piston head 20 of the valve from the gas compressed within the container 10. The interior of the coupling unit 13 is, however, at this point still under pressure as delivered by the regulator but this commences to vent through the now-open interface as illustrated by arrow B in FIG. 3. Such venting will also allow any compressed gas within the apparatus downstream of the container assembly (if such is fitted) to vent to the atmosphere. With the reduction in pressure within the cylinder 47 the spring 50 closes the piston 45 and draws the tip 51 of the pin 49 out of the arcuate groove 31 allowing further rotation of the coupling unit 13 to take place until the flanges 35, 36 on the skirt of the coupling unit 13 are out of register with the flanges 25, 26 on the turret 57 of the base unit 12 so that the coupling unit 13 can be lifted off.

The connector spigot surrounding the passage 56 on the coupling unit 13 has been illustrated schematically simply for convenience although the precise form of this connector will depend on the nature of the apparatus to be connected to the container assembly.

The operation for separation of the coupling unit 13 thus involves manual depression of the pin 41, a first partial twist of the coupling unit 13 at which point gas escape will be heard, and once this gas has escaped further rotation of the coupling unit 13 is possible allowing the coupling unit 13 to be lifted and separated from the base unit 13 quickly and safely.

Figure 6:
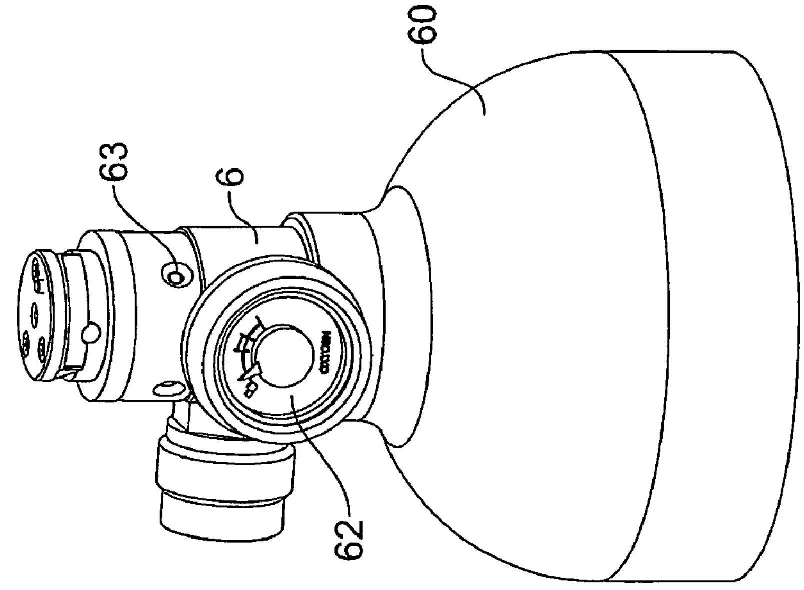
FIG. 6 is a schematic view of the upper part of a pressurized gas cylinder having a first part of the modular coupling system of the present invention fitted thereto.

Referring now to FIG. 6, there is shown the upper part of a pressurized gas canister 60 having a permanently secured gas pressure regulator 61 fitted thereto. As explained above, the regulator 61 may be secured to the gas canister 60 by fixing means which require specialist tools to remove it, or may be permanently secured in such a way that it is not removable from the gas canister. The pressure regulator 61 has a gauge 62 indicating the residual pressure of the gas within the canister. Typically, as mentioned above, the pressure regulator reduces the pressure of gas from the typical maximum charge value of 300 bar down to about 4 bar.

Figure 7:
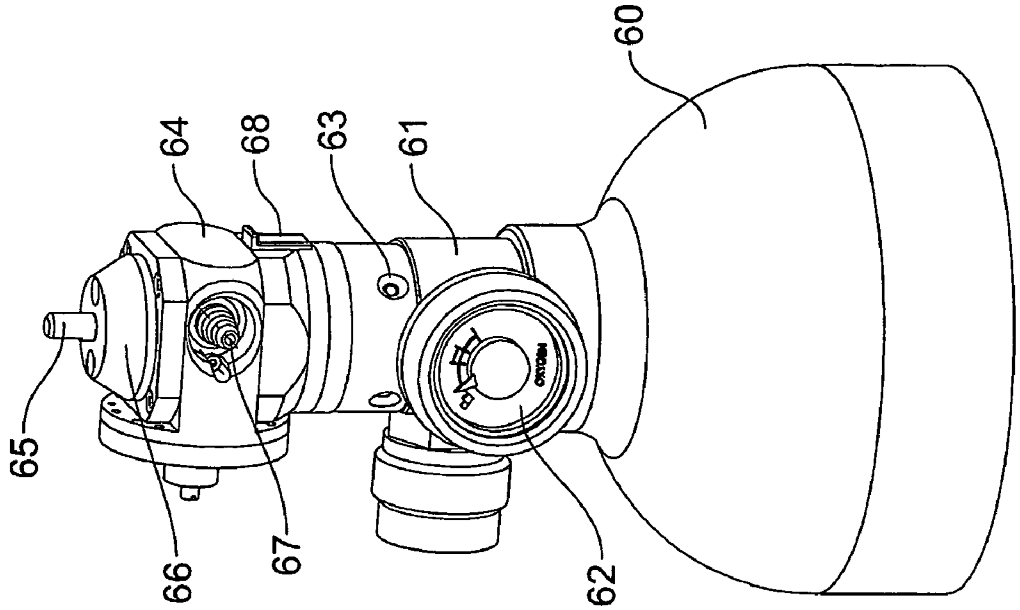
FIG. 7 is a similar perspective view of the upper part of a gas cylinder showing a utilizer device, in the form of a flow meter, releasably secured thereto using the modular coupling system of the present invention.

Permanently secured to the pressure regulator 61 is a first part 63 of a modular coupling system the form of which will be described in greater detail below. As can be seen in FIG. 7, the second part of the modular coupling system is in this embodiment integrally formed with a gas utilizer device 64, in this case a flow meter, which is a device for accurately controlling the rate of flow of gas delivered through an outlet spigot 67 to which an ultimate consumer device (such as breathing apparatus if the canister were filled with oxygen) is connected. The flow meter has an adjustment control knob 65 turning which determines the precise rate of flow of gas through the utilizer device 64, and the selected value (of which there are typically in the region of eleven or twelve different settings) is shown through a window 66.

As with the first embodiment, the utilizer device 64 with incorporated second part of the modular coupling system can be removed quickly and easily from the gas bottle, in this embodiment by means of a simple, single twist operation. This operation closes a main gas delivery valve in the first coupling part 63 and vents to atmosphere the gas pressure within the utilizer device 64 and (if fitted) the ultimate consumer device connected to the outlet spigot 67. A manually operable latch 68 is provided to lock the two coupling parts against relative rotation and therefore inadvertent separation. The latch 68 is spring loaded into its engaged position, and can be lifted with a finger or thumb, to be urged axially of the utilizer device 64 away from the canister 60 releasing the two coupling parts for predetermined limited relative twisting motion as will be described in more detail below.

Figure 8:
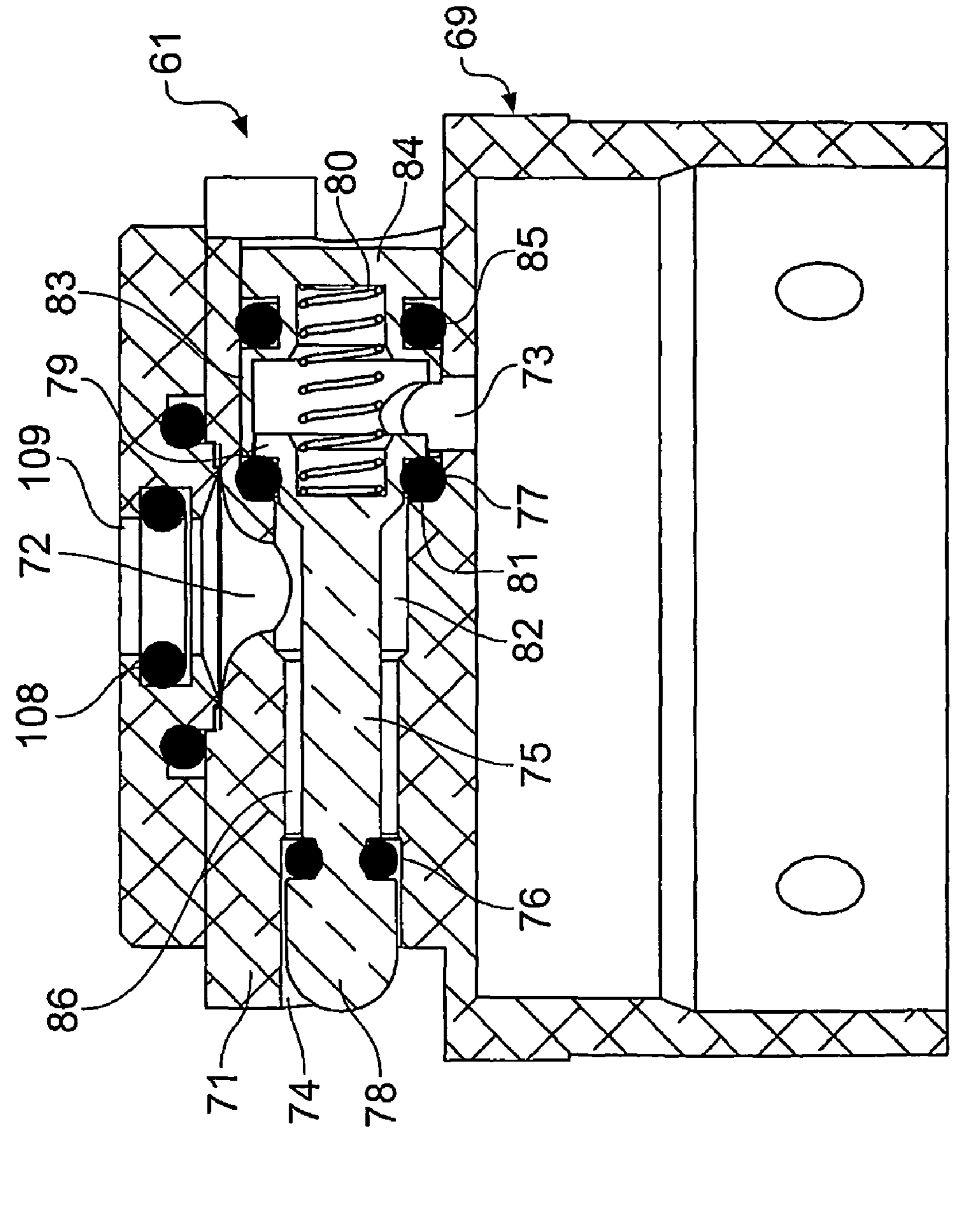
FIG. 8 is an axial sectional view through the first coupling part of a modular coupling system according to the invention.
Figure 9:
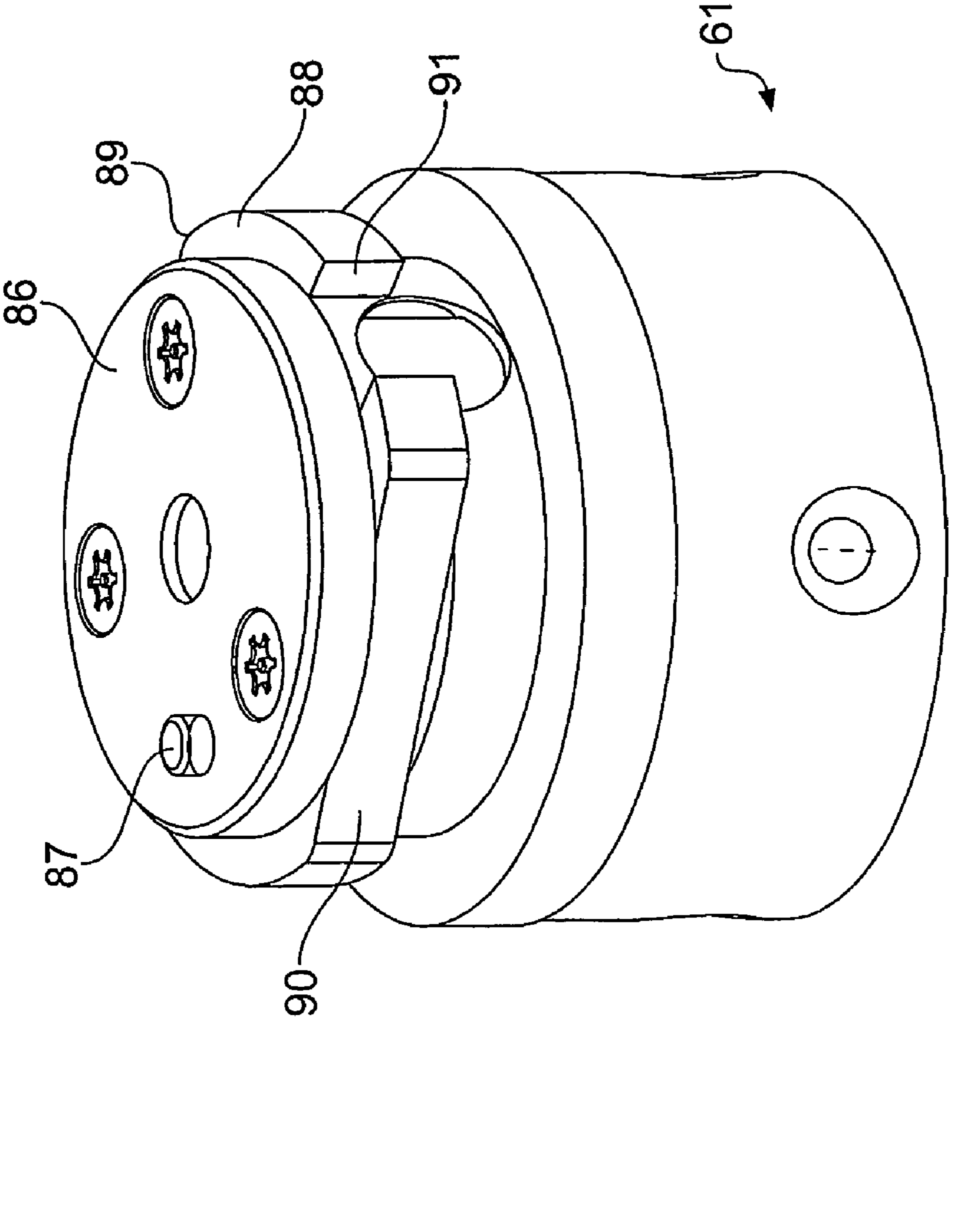
FIG. 9 is a perspective view from above of the outer casing of the first coupling part illustrated in FIG. 8.

Turning now to FIGS. 8 and 9, the first coupling part 61 is illustrated in more detail. As can be seen in FIG. 8 this coupling part has a cup-shape main body 69 with a cylindrical depending skirt 70 having four transverse openings 71 through which fixings such as screws can be introduced to retain the skirt 70 on the integral pressure regulator 61.

The bottom of the cup-shape body 69 (which is uppermost in FIG. 8 as the cup-shape body 69 is inverted in use) has a central boss 71 having two axially extending passages 72, 73 the former being co-axial with the axis of the skirt 70 and the latter being offset laterally as can be seen in FIG. 8. A transverse passage joins the two axial passages 72, 73 and houses a slidable elongate slide valve 75 having two O-ring seals 76, 77. The slide valve 75 has a bull-nose projecting free end 78 at the open end of the passage 74, and a radial flange 79 at the inner end engaging the sealing ring 77. A compression spring 80 urges the slide valve 75 to the left as illustrated in FIG. 8 to a position where the sealing ring 77 engages between the flange 79 and a shoulder 81 in the passage 74 between a central part 82 of the passage 74 and an enlarged end part 83 thereof. The enlarged part 83 of the passage 74 is closed by an end cap 84 and sealing ring 85.

The passage 74 has an intermediate narrowed section 86 into which the sealing ring 76 enters when the bull nose end 78 is pressed (to the right as viewed in FIG. 8) against the action of biasing spring 80. This action also separates the sealing ring 77 from the shoulder 81 opening the valve formed thereby and allowing communication between the axial passages 72 and 73. The structure comprising the flange 79, sealing ring 77, shoulder 81 and biasing spring 80 thus constitutes the main delivery valve of the coupling assembly.

As can be seen in FIG. 9, the central boss 71 of the body 69 has an upper face 86 from which projects an eccentric axially extending pin 87, the function of which will be explained in more detail below. A partly annular ridge 88 of the boss 71 projects radially and defines an annular shoulder with two diametrically opposed flats 89, 90 and a circumferential interruption 91, the purpose of which will be explained below.

Figure 10:
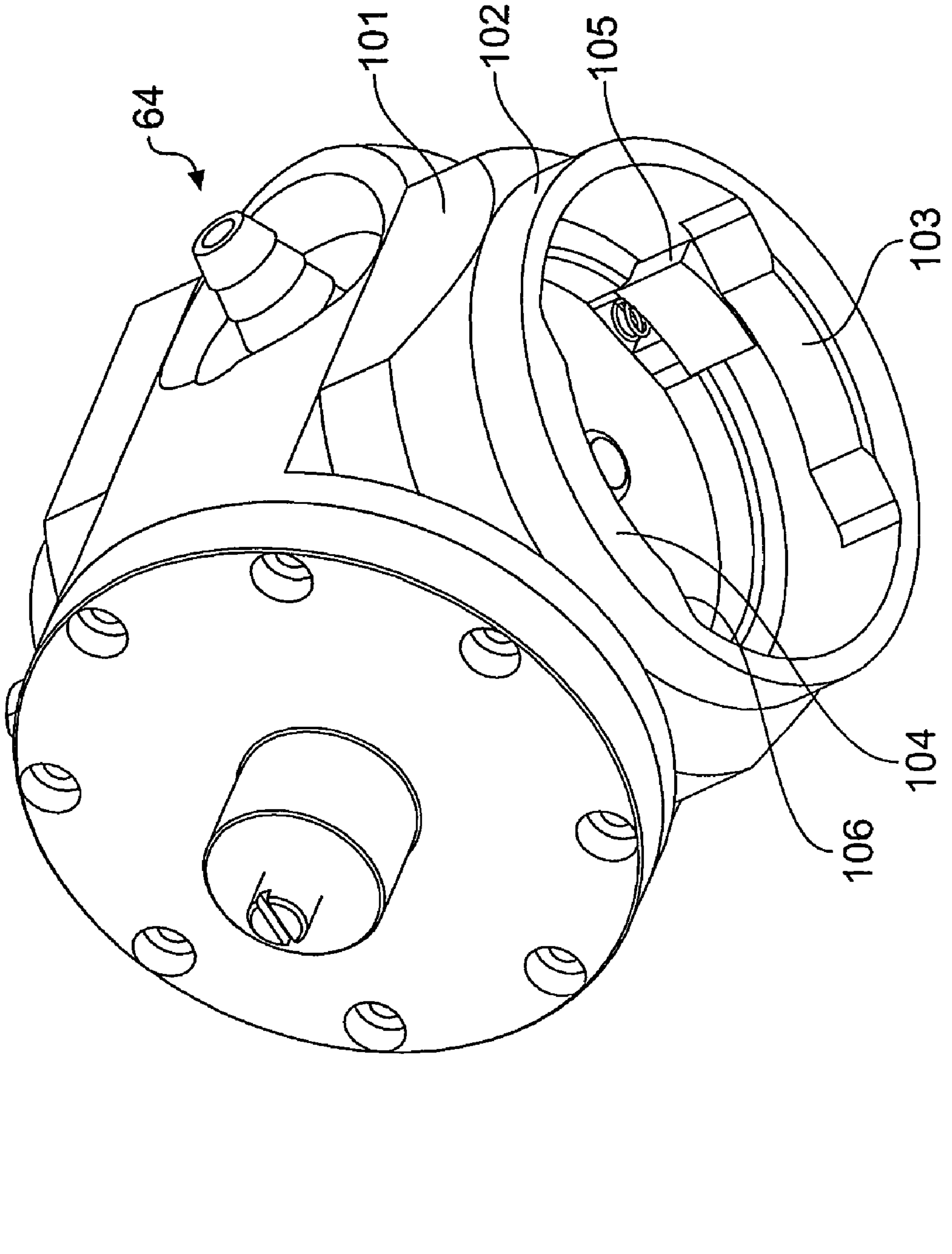
FIG. 10 is a perspective view from below and one side of a second coupling part of the modular coupling system of the invention, adapted to be fitted to the first coupling part illustrated in FIGS. 8 and 9.
Figure 11:
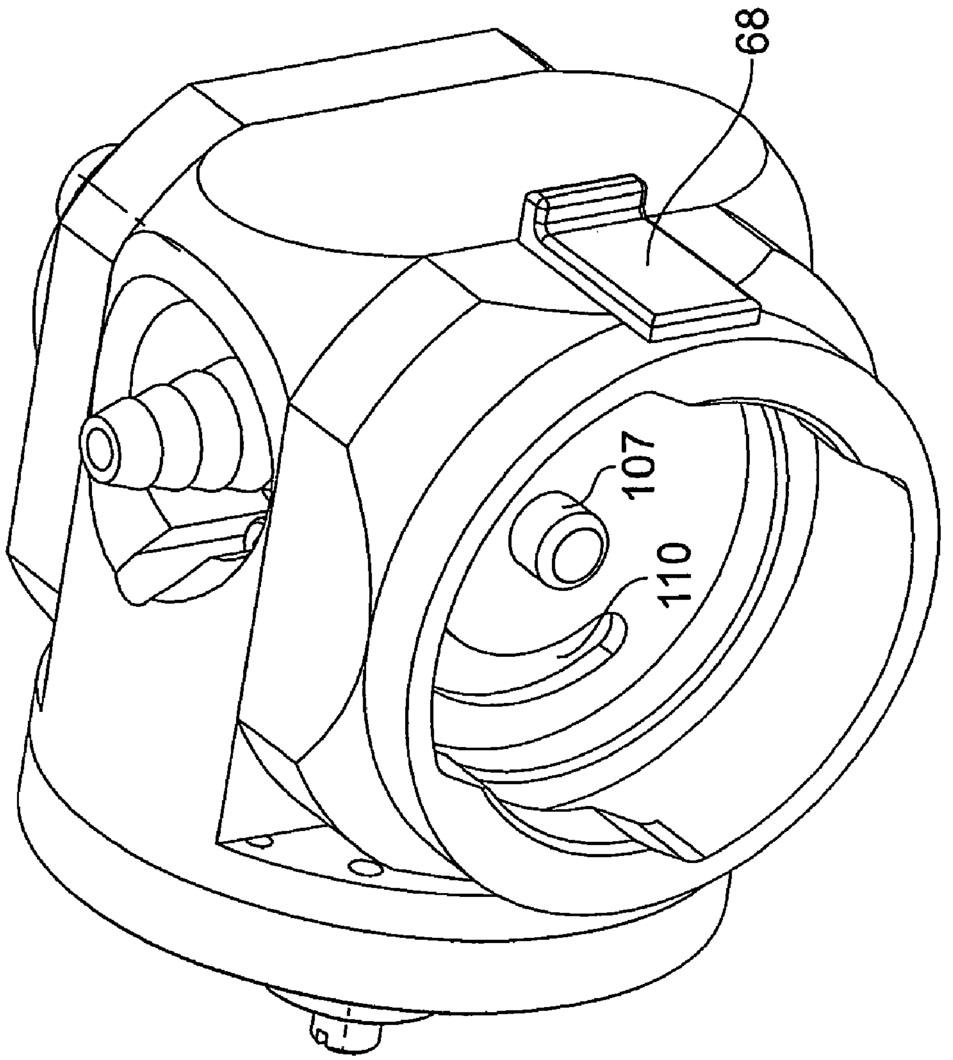
FIG. 11 is a perspective view from below of the second coupling part illustrated in FIG. 10, shown from a different angle.

The second coupling part illustrated in FIGS. 10 and 11, in this embodiment formed integrally with a flow meter, has a body 101 with a downwardly depending skirt 102 having two inwardly projecting arcuate ribs 103, 104.

As can be seen in FIGS. 10 and 11 the latch 68 described in relation to FIG. 7 has an internal abutment nose 105 which, when the first and second coupling parts are engaged together, locates in the interruption 91 of the circumferential radial rib 88. The second coupling part is fitted over the first coupling part with the inwardly projecting ribs 103, 104 in register with the flats 89, 90 of the circumferential radial rib 88 of the first coupling part in which configuration a corner of the abutment member 105 engages against the upper face of the circumferential radial rib 88 and is displaced axially as the coupling member incorporated in the flow meter is pressed down onto the first coupling part. Then, upon relative twisting of the flow meter 64 in relation to the first coupling part 63 the radially inwardly projecting ribs 103, 104 engage under the circumferential radial rib 88 of the first coupling part and an inclined or ramp face 106 of the rib 103 engages the bull nose 78 of the slide valve 75 pressing this inwardly as the two coupling parts are turned in relation to one another. This moves the sealing ring 76 into the narrow portion 86 of the passage 74 and closes the gas escape route and then (in the same movement) opens the main delivery valve constituted by the sealing ring 77 and shoulder 81 allowing gas from the canister to pass through the passage 73 into the passage 72. A spigot 107 in the centre of the cavity defined by the depending skirt 102 engages a sealing ring 108 in the outlet opening 109 from the first coupling part 69 guiding the gas into the flow meter.

The pin 87 engages in an arcuate slot 110 in the end face of the inner cavity of the second coupling member to determine the relative orientation of the two components as they are fitted together and to limit the relative angular twisting movement which can take place. This pin 87 and slot 110 combination also serves another function, namely that of ensuring that gas cylinders containing a given gas can only be fitted with utilizer devices intended for use with that gas. By suitably selecting the dimensions of the pin 87 and the slot 110 to match one another the connector can be made gas-specific and incorrect connection of, for example, oxygen utilizer devices to propane gas cylinders can be avoided.

Figure 12:
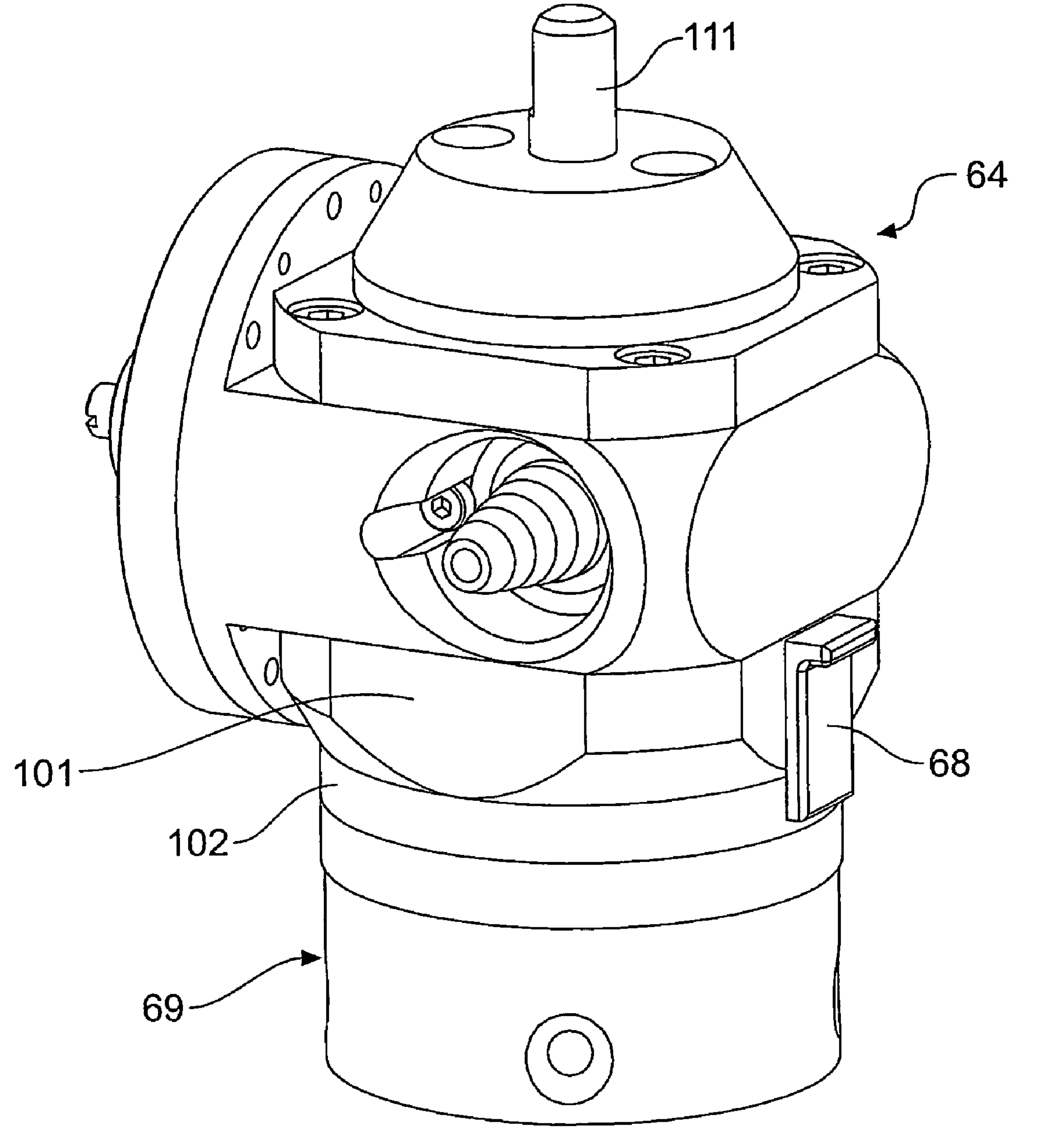
FIG. 12 is a perspective view of the two coupling parts illustrated in FIGS. 8 to 11 fitted together in their assembled condition.

The assembled unit as shown in FIG. 12 has an adjustment spindle 111 by which the rate of flow of gas through the unit can be determined. The latch 68, engaging in the interruption 91 prevents relative rotation of the two coupling parts and therefore ensures that the unit cannot be inadvertently separated from the gas canister. When it is desired deliberately to remove the flow meter, for example to utilize the gas canister for another purpose, the latch 68 is displaced axially away from the canister lifting the abutment end 103 out of the interruption 91 in the circumferential radial rib 88 and allowing the flow meter to be turned in relation to the first coupling part. A single, simple twist then disengages the cam-shape rib 103 from the bull-nose 78 of the slide valve 75 allowing the spring 80 to displace the slide valve closing the main delivery valve constituted by the sealing ring 77 and the shoulder 88 and moving the sealing ring 76 out of the narrowed portion 86 of the passage 74 thereby opening an escape route for compressed gas in the flow meter through the passage 72 and out around the sealing ring 76 (now in a larger part of the passage 74) and shortly thereafter the ribs 103, 104 become aligned with the flats 89, 90 and the flow meter can be lifted from the gas canister.

Although specific reference has been made herein to the use of the coupling system with gas canisters containing a gas suitable for medical use (such as oxygen), it will be appreciated that the invention is not limited to such applications and can be used in any environment where a number of gas containers may need to be coupled to a variety of gas utilizer devices, or even where a single utilizer device is used but needs to be removed periodically, such as for recharging the container.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A modular coupling system for pressurized gas containers, said containers comprising an integral flow regulator, the coupling system comprising a first coupler part adapted to be fixedly secured to a pressurized gas container in a substantially non-removable manner and a second coupler part adapted to be fixedly secured to, or integrally formed with, a gas utilizer device or equipment such as a flow meter, conservor or other delivery apparatus, the first coupler part being provided with valve closure means and the coupling system having venting means allowing escape of trapped pressurized gas upon removal of a gas utilizer device or equipment from a pressurized gas container before separation of the first and second coupler parts takes place, and the first coupler part has a gas delivery valve resiliently biased to a closure position, the gas delivery valve having a valve-operating member engaged in use by the second coupler part upon coupling together of the first and second coupler parts, and the first and second coupler parts have a common axis and the valve-operating member is displaceable transversely thereof to effect opening or closure of the gas delivery valve as the first and second coupler parts are turned with respect to one another about the common axis.

2. The modular coupling system according to claim 1, in which the first and second coupler parts have a common axis and the valve-operating member is displaceable axially thereof to effect opening or closure of the gas delivery valve and the second coupler part has a helical or part-helical cam face causing relative axial movement of the first and second coupler parts as they are turned with respect on one another about the said common axis.

3. The modular coupling system as claimed in claim 1, in which the said venting means is linked to a gas delivery valve having a valve arrangement so that the said venting means is opened by the same valve arrangement as closes the gas delivery valve itself.

4. The modular coupling system according to claim 1, in which the venting means comprise a valve sealing member carried on a valve stem of the gas delivery valve such that closure of the gas delivery valve and opening of the gas venting means take place in sequence upon displacement of the single valve-operating member constituted by the valve stem.

5. The modular coupling system as claimed in claim 1, further comprising a safety interlock member which retains the first and second coupler parts in their coupled position against inadvertent separation thereof.

6. The modular coupling system as claimed in claim 1, further comprising male and female interconnecting parts on respective coupling parts the form or dimensions of which are related to the gas intended for use therewith to inhibit interconnection of the first and second coupling parts of systems intended for use with different gases.

7. A pressurized gas container assembly of the type comprising: a container with an integral flow regulator, having means for releasably coupling said container to utilizer equipment such as a flow meter, conservor, flow indicator or delivery apparatus, wherein the releasable coupling means is a modular coupling system comprising: a first coupler part adapted to be fixedly secured to a pressurized gas container in a substantially non-removable manner, and a second coupler part adapted to be fixedly secured to, or integrally formed with, said utilizer equipment such as a flow meter, conservor, flow indicator or delivery apparatus, the first coupler part being provided with valve closure means and the coupling system having venting means allowing escape of trapped pressurized gas upon removal of said gas utilizer equipment such as a flow meter, conservor, flow indicator or delivery apparatus, from said pressurized gas container before separation of the said first and second coupler parts takes place, and the second coupler part has a first interlock device comprising an abutment member resiliently biased to an inoperative position in which it allows relative movement of the first and second coupler parts in relation to one another, and displaceable against the resilient bias by gas under pressure within the second coupler part arriving from the closure valve upon opening thereof as a utilizer device is connected to the gas container.

8. The pressurized gas container assembly as claimed in claim 7, in which the first interlock device comprises a pin one end of which enters a cavity or recess in the first coupler part of the coupling means to limit the relative rotation of the first and second coupling parts about a common axis thereof when the gas pressure within the coupling means exceeds a threshold value set by the resilient bias acting on the pin.

9. The pressurized gas container assembly according to claim 7, in which there is a seal between the first and second coupler parts, which is brought into gas tight sealing operation as one coupler part is turned about the said axis of relative rotation with respect to the other coupler part.

10. The pressurized gas container assembly according to claim 7, further comprising a second interlock device resiliently biased to an operative position and brought into engagement upon connection of the first and second coupler parts to define the engaged condition of the coupling means.

11. The pressurized gas container assembly according to claim 7, in which axial separation of the first and second coupler parts is resisted while the two parts of the coupling means are moving between the engaged and the release positions thereof, by the interengagement of a part-circumferential radially outwardly projecting flange or shoulder on one coupling part with a part-circumferential radially inwardly projecting flange or shoulder on the other coupling part.

* * * * *